United States Patent
Haugli et al.

(10) Patent No.: US 6,522,638 B1
(45) Date of Patent: Feb. 18, 2003

(54) PACKET DATA COMMUNICATION SYSTEM WITH BUFFERED DATA AND CONTROL CHANNELS

(75) Inventors: Hans-Christian Haugli, Rockcliffe Park (CA); Bachittar Singh Sembi, Kanata (CA); Brian Armbruster, Kanata (CA)

(73) Assignee: Vistar Telecommunications Inc., Ottawa (CA)

(*) Notice: Subject to any disclaimer, the term of this patent is extended or adjusted under 35 U.S.C. 154(b) by 0 days.

(21) Appl. No.: 09/275,093

(22) Filed: Mar. 24, 1999

Related U.S. Application Data

(60) Provisional application No. 60/079,134, filed on Mar. 24, 1998.

(30) Foreign Application Priority Data

May 11, 1998 (CA) ............................................. 2237289

(51) Int. Cl.[7] .................................................. H04Q 7/00
(52) U.S. Cl. .................... 370/329; 370/321; 370/322; 370/329; 370/349; 370/348; 370/337; 370/347
(58) Field of Search ............................... 370/321, 222, 370/329, 337, 347, 348, 389, 349

(56) References Cited

U.S. PATENT DOCUMENTS

| | | | |
|---|---|---|---|
| 4,726,040 A | | 2/1988 | Acampora |
| 5,029,183 A | * | 7/1991 | Tymes ........................ 370/338 |
| 5,546,380 A | * | 8/1996 | Tomasi et al. ............... 370/252 |
| 5,561,846 A | * | 10/1996 | Hagio ......................... 370/337 |
| 5,729,531 A | * | 3/1998 | Raith et al. ................. 370/252 |
| 5,729,541 A | * | 3/1998 | Hamalainen et al. ........ 370/337 |
| 5,883,887 A | * | 3/1999 | Take et al. ................... 370/316 |
| 5,953,328 A | * | 9/1999 | Kim et al. ................... 370/310.1 |
| 5,991,279 A | * | 11/1999 | Haugli et al. ............... 340/7.34 |
| 6,014,089 A | * | 1/2000 | Tracy et al. ............ 340/870.02 |
| 6,178,337 B1 | * | 1/2001 | Spartz et al. ............... 370/335 |
| 6,308,076 B1 | * | 10/2001 | Hoirup et al. .............. 370/324 |

FOREIGN PATENT DOCUMENTS

| EP | 0 687 078 | 12/1995 |
|---|---|---|
| EP | 0 802 677 | 10/1997 |

* cited by examiner

*Primary Examiner*—William Trost
*Assistant Examiner*—Marcos L Torres
(74) *Attorney, Agent, or Firm*—Marks & Clerk

(57) ABSTRACT

A packet data communication system includes a control station and a plurality of mobile terminals that communicate on demand with the control station over a wireless link. The control station has a data port for receiving data packets destined for the terminals, an arrangement for generating a plurality of data channels for carrying the data packets, and an arrangement for assigning the data packets destined for a particular terminal to one or more of the data channels. A control channel carries control information pertaining to the data channels. The channels are transmitted to the mobile terminals as an r.f. signal. The terminals have a receiver for receiving the r.f. signal, an analog-to-digital converter for digitizing the received signal, and a buffer for storing the digitized received signal. The terminals continually monitor the control channel to extract control information. The stored signal is processed to extract packet data destined for the terminal from one or more of the data channels in response to control information received on the control channel.

16 Claims, 6 Drawing Sheets

PACKET DATA COMMUNICATION SYSTEM WITH BUFFERED DATA AND CONTROL CHANNELS

This application claims the benefit under 35 USC 119(e) of prior U.S. provisional application No. 60/079,134 filed Mar. 24, 1998.

This invention relates to a packet data communication system suitable for transferring data between a large number of mobile terminals and a central control station. The system is particularly suited for a satellite based system, where the central control communicates with the terminals via an orbiting satellite, but it could be applied to ground based systems.

There are many situations where it is desirable to transfer data between a control station and a plurality of distributed mobile terminals. For example, in the trucking industry, the truck's on-board monitoring and logging devices may automatically report usage and location information back to a central station. Also, information relating to the environmental conditions, condition of the load, for example, or the temperature of refrigerated containers, can be reported. The operator may need to send schedule or routing changes to the drivers. Paging systems require text messages to be sent to individual customers. Traditionally these systems have carried relatively small amounts of data and do not require wideband channels. The bandwidth requirements, however, can change from time to time depending on the type and amount of data that needs to be transferred. Clearly, for example, voice channels will require a wider bandwidth channel than one that merely communicates position or environmental information.

Typically, SCPC (a Single Carrier per Channel) techniques are employed for such systems. In SCPC, as the name implies, each active channel is assigned a single narrow band carrier, typically not more than 20 KHz wide. The assigned channel depends on availability and desired bit rate. Bit rates are typically 0.6, 4.8, 19.2, kilobits per second. When the control station wishes to send a message to the terminal, the targeted terminal is notified over a very low bit rate control channel that it should expect to receive a message on a particular frequency. The targeted terminal then tunes to that frequency in order to receive and decode the incoming message.

In order to provide a sufficient number of channels, the maximum channel bit rate is typically limited to 19.2 kilobits per second. This means that such systems are not capable of carrying high quality voice signals, which typically require at least 32 kilobits per second. Such systems are generally not suitable for handling graphic information such as web pages, which is becoming an increasingly important application.

The need to assign a message channel over a control channel before passing the message also introduces a delay, known as latency, which makes it difficult to conduct interactive communications, for example, with the keyboard in real time.

An object of the invention is to provide a system that alleviates these disadvantages.

According to the present invention there is provided a packet data communication system having a control station and a plurality of remote terminals that communicate on demand with said control station over a wireless link, said control station comprising a data port for receiving data packets destined for said terminals; means for generating a plurality of data channels for carrying said data packets; means for assigning said data packets destined for a particular terminal to one or more of said data channels; means for generating a control channel carrying control information pertaining to said data channels; and means for transmitting said carriers to said mobile terminals as an r.f. signal; and each of said terminals comprising a receiver for receiving said r.f. signal; an analog-to-digital converter for digitizing said received signal; a buffer for storing said digitized received signal; means for monitoring said control channel to extract control information therefrom; and means for processing said stored signal to extract said packet data destined for said terminal from one or more of said data channels in response to control information received on said control channel.

Normally the received signal will be downconverted and demodulated to baseband prior to analog-to-digital conversion, although if desired with high speed processors it is contemplated that the entire processing could take place in the digital domain.

The remote terminals can either be fixed or mobile.

This system has the advantage of flexibility. Data packets can be sent on one channel or distributed simultaneously over several channels depending on the bandwidth requirements. For low bit rates, a single channel can be shared among several terminals. Unlike the prior art, it is not necessary for the channel assignment information to be sent in advance of the message. The assignment information on the control channel and the message can be sent simultaneously since the raw incoming data is stored. Only minimal processing is required to extract assignment information unless the control channel indicates that a message is addressed to the terminal in question, in which case the message can be extracted from the assigned carrier(s).

The carriers are preferably generated in a digital signal processor (DSP), which carries out the channel assignments. The channels are then transmitted by means of the r.f. carrier, normally via satellite, to the destination terminals.

The aggregate channels on the r.f. carrier are transmitted as frames bounded by predetermined time instants. Each buffer typically stores one frame of information. Each frame can contain multiple packets distributed across multiple channels.

The control information informs a particular terminal that the current frame contains a message for that terminal, as well as the channel assignments, and time and frequency reference information. Only minimal processing is required at the terminals to monitor the control channel since this has a very narrow bandwidth, typically 600 b.p.s. No attempt is made to decode the data unless a message is received from the control channel that data is present for the terminal in question.

Each terminal also contains a DSP, which on receipt of a control message decodes the currently stored frame to extract data packets destined for that terminal. If the data contains wideband information, such as graphics, the packets are likely to be distributed sequentially over several channels. The DSP will extract the packets from the various channels in accordance with the information received on the control channel and arrange them in the appropriate order before outputting them to the data processing circuitry.

The signal processing is preferably carried out with an advanced DSP, such as the TMS320C60.

The system is thus capable of generating and demodulating simultaneous multiple carriers within the sampling bandwidth. Per frame adaptive processing of multiple carriers is achieved through buffered data and sequential processing.

The system can support multiple bit rates and power levels. It can also support multiple return access methods, such as unslotted ALOHA, slotted ALOHA and assigned channel. It can be used for mobile dispatch services employed text and canned messages, medium length messages with low latency, as well as for TCP/IP connections which provide LAN extension, FT protocol, email and database transactions.

The invention also provides a method of establishing communication between a control station and one or more of a plurality of mobile terminals over a wireless link, comprising the steps of generating a plurality of carriers; dynamically assigning one or more data carriers to a destination terminal; modulating said one or more carriers with packet data for said destination terminal; generating a control carrier containing information pertaining to said modulated carriers; transmitting said data carriers and said control carrier as an aggregate signal to said destination terminal; buffering said aggregate signal at said destination terminal; extracting said control information from said aggregate signal; and extracting data from said buffered signal in response to a received assignment in said control information.

The invention also provides a system for improving data throughput by utilizing a bandwidth manager. The bandwidth manager monitors network parameters and compares current parameters with statistical data stored in a database. Heuristic rules are used to decide what changes need to be made to the parameters to optimize throughput.

The invention will now be described in more detail, by way of example only, with reference to the accompanying drawings, in which.

Figure 1:
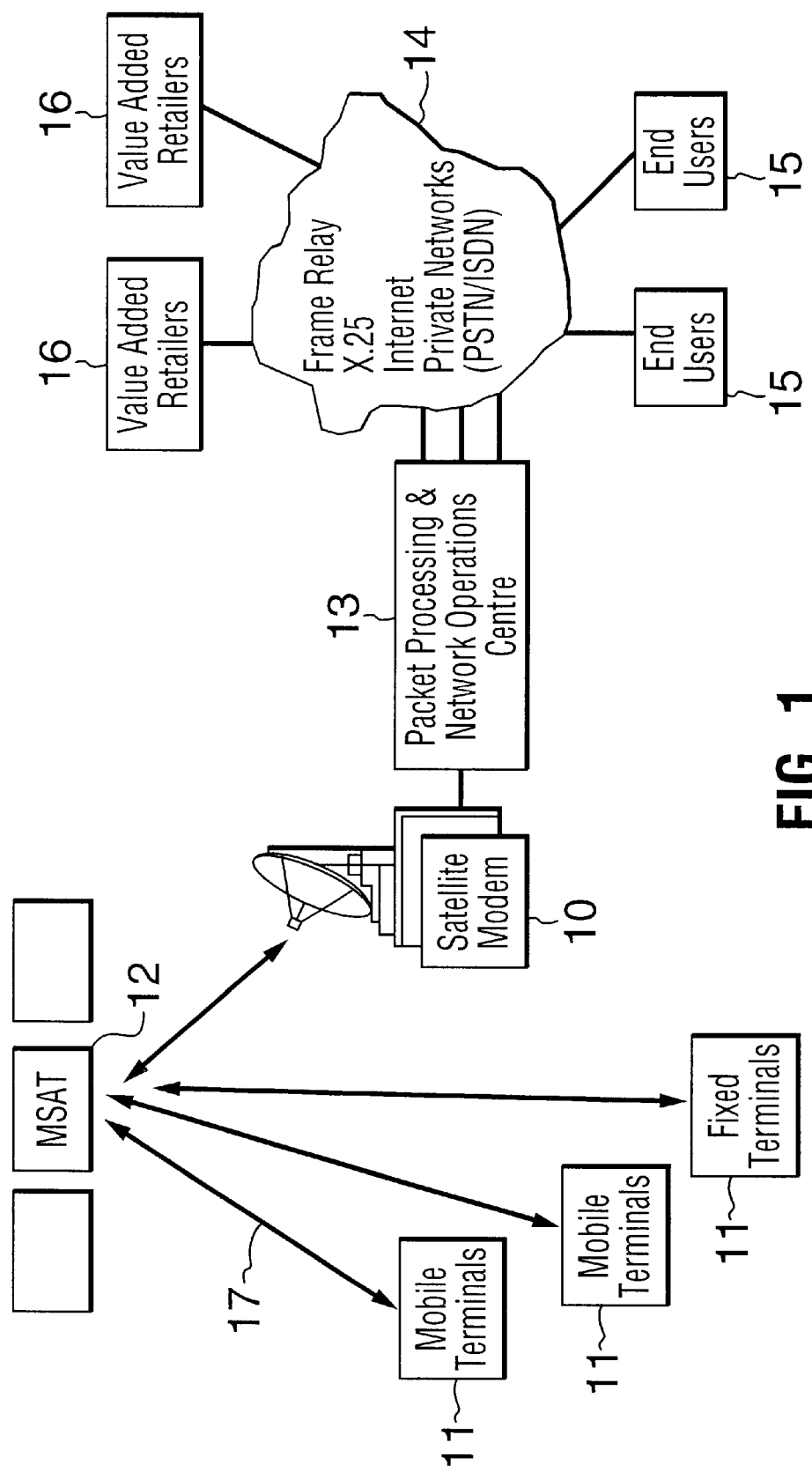
FIG. 1 is a block diagram of a multiple rate satellite packet data system.

Referring to FIG. 1, a satellite ground station 10 communicates with remote terminals 11 over two-way r.f. links, which may be either fixed or mobile, via satellite 12, such as an MSAT. The links can operate at any frequency capable of carrying data. In the case of satellites, this will typically lie in the gigahertz range. The satellite 12 could, for example, be INMARSAT.

The ground station 10 is connected to the packet processing network operations center 13, which in turn is connected over a wide area packet network 14 to end users 15 or value added retailers 16. The packet network 14 may, for example, be frame relay, X..25, Internet, a private network, or the PSTN/ISDN.

The end users can be equipment operators, such as trucking companies wishing to communicate with mobile terminals in their trucks. The value added retailers could, for example, be paging operators selling paging services to the public.

The bandwidth requirements can vary significantly according to the type of information to be transmitted. Simple text messages, such as are sent by paging services, require very little bandwidth, whereas voice or graphics messages require much greater bandwidth. The invention permits wide bandwidth messages to be aggregated over several channels and the appropriate assignment information to be transmitted simultaneously to the mobile terminals.

The ground station 10 receives packet data destined for a particular terminal from the network processing center 13 and forwards it via satellite 12 to the destination terminal 11. The ground station 10 generates a plurality of SCPC (Singe Channel Per Carrier) data carriers of predetermined, but varying, bandwidth in a digital signal processor, assigns the packets to one of more of the data carriers and then transmits the aggregate signal, after upconversion, over r.f. links 17 to the terminals 11. In addition, the ground station 10 transmits a narrow band control channel, typically 600 bps., containing the timing and reference information that the terminal needs to extract the packet data from the transmitted frames. The control channel also notifies the terminals when frame contains information destined for them and how the information is distributed across the available channels.

Figure 2:
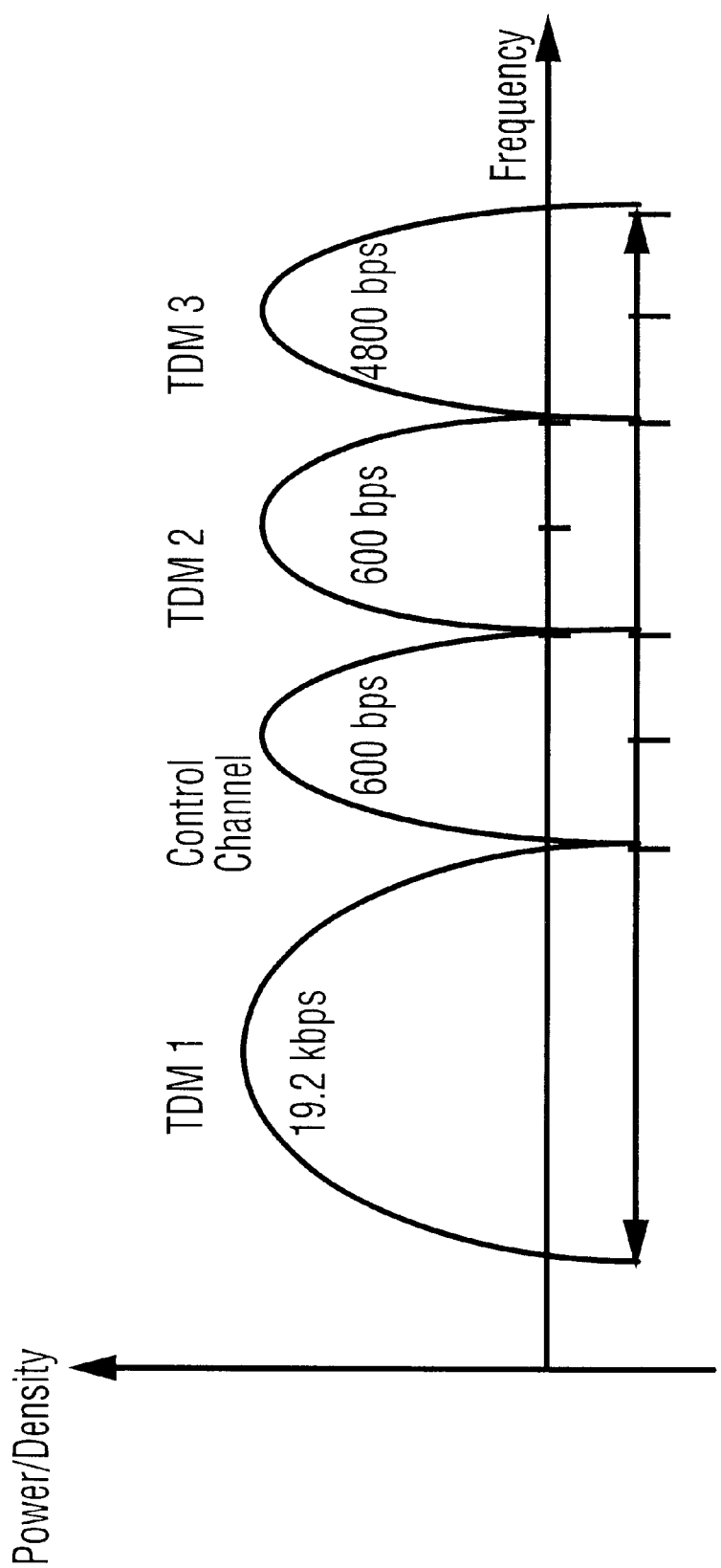
FIG. 2 shows the forward link spectrum.

FIG. 2 shows the link spectrum for the forward link. In the example given, this consists of a 19.2 kbps TDM data channel, a 600 bps control channel, which is typically centered for convenience of access, a 600 bps data channel and a 4800 bps data channel. These channels, which can be thought of as a series of modulated carriers are actually created in the digital domain in the digital signal processor in the control station. The channels extend over a bandwidth of 100 KHz or more. The channels are combined in the digital signal processor to form a baseband signal, which is then passed through a digital-to-analog converter to create an analog baseband signal. This is then modulated in a Quadrature modulator onto a carrier, typically at 1450 Mhz. This signal is typically upconverted to a frequency in the order of 13 GHz for transmission over the links 17 to the satellite 12. The Q modulators allow two separate baseband signals, each consisting of several channels, to be carried on the same carrier.

Figure 3:
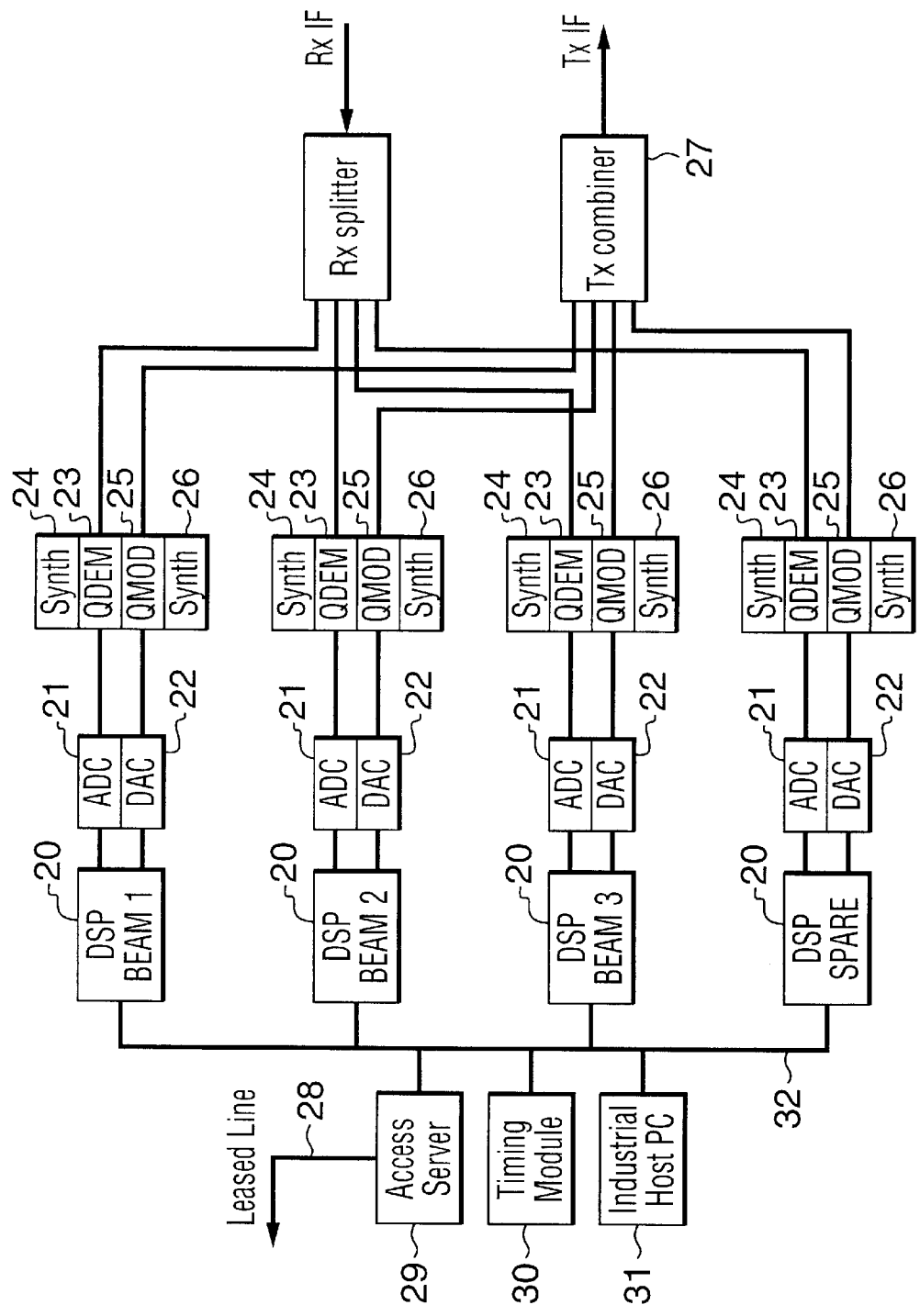
FIG. 3 is a block diagram of a part of a satellite ground station.

FIG. 3 is a block diagram of the carrier processing section in the control station. This consists of four TMS320C60 digital signal processors 20, one for each satellite beam, each connected to an analog-to-digital converter 21 and digital-to-analog converter 22, which in turn are respectively connected to Quadrature demodulators 23 associated with frequency synthesizers 24 and Quadrature modulators 25 associated with frequency synthesizers 26. The output of the Q modulators 23 is combined in a transmit combiner to generate an IF signal at 1450 Mhz. This IF signal is eventually upconverted to 13 GHz for satellite transmission.

The data packets are received over a leased line 28 from packet network 14 by access server 29, which addresses the packets to the appropriate terminal. The access server 29, as well as a timing module 30 and host PC 31 are connected to the DSPs 20 over bus 32.

The DSPs 20 generate carriers between 0 and 100 KHz in the digital domain. Incoming data packets are buffered and then mixed with one or more digital subcarriers, depending on the data rate, and the subcarriers combined into a baseband signal, typically ranging from 0 to 100 KHz. The DSPs also create a control channel, which in addition to carrying timing information, carries the channel assignments to the remote terminals.

The carriers are combined in the DSP and outputted as a 0–50 KHz (0–100 KHz) baseband signal, which is passed through DAC 22 before being input to Qmod 25, which creates a 1450 MHz IF signal for upconversion to the frequency of the satellite link.

Typically, the DSPs 20 generate up to ten carriers over 50 KHz of bandwidth. The carriers can have different channel rates, such as 0.6, 4.8, 19.2 bps at different power levels to support terminals with different antenna characteristics, such as gain, size, etc. If packets arrive for a particular terminal at a very low bit rate, it may be possible to send them out on a single carrier. However, if the rate is too great for a single carrier, they can be distributed across one or more channels and transmitted simultaneously. The DSPs 20 keep track of the channel assignments and transmit this information to the remote terminals on the control channel.

The system also allows the dynamic assignment of data packets to various channel types as warranted. While waiting to be transmitted, data packets are stored in queues at the control station 10 or at a mobile terminal. 11. Based on the number of packets in the queue, the growth rate of the queue, and the protocol used by the application (e.g. FTP, HTTP, email, etc.), a decision can be made to use random access channels, assigned TDM or TDMA channels, or dedicated (stream) channels to transmit the packet(s). Because these channels can be created dynamically, and the traffic can be assigned to them as warranted, the latency for transmission of data packets can be minimized if appropriate, while using the transmission bandwidth effectively.

This flexibility is particular powerful for the transmission of TCP/IP based communications, where the data rate required by the applications varies widely from instant to instant. The dynamic selection system allows the flexibility to respond to this variation in a flexible manner.

For example, a user at a mobile terminal 11 may be using a WWW client to browse information on the Web. After he clicks on a link to request a new page from a server, a series of communications occur. First there is a query from the MT 11 to a Domain Name Server (DNS) on the Internet to get the IP address of the server, then a response from the DNS, then a request by the MT to get the page from the WWW server. This initial exchange of small packets can be done using random access channels in the return and forward directions. When the WWW page data begins to be delivered from the server, the queue for that MT at the satellite packet processing centre 13 begins to grow. At this point the dynamic channel selection process could decide to assign a TDM channel from the satellite ground station 10 to the MT 11 to deliver the rest of the data to the MT. Similarly, the acknowledgements of the data packets returned by the MT to the server could be carried by an assigned TDMA return channel.

The user may then wish to upload a file from his MT to a FTP server on the Internet. As FTP transfers are typically large, a return stream channel could be created from the MT to the satellite ground station. The forward acknowledgements could be carried in a assigned TDM channel.

The packet lengths can vary and be mixed, but they typically may be 64, 256, 1000 and 4000 bits. The packets are transmitted in frames, which typically may have a duration of over one second and contain 8 to 324 packets.

Figure 4:
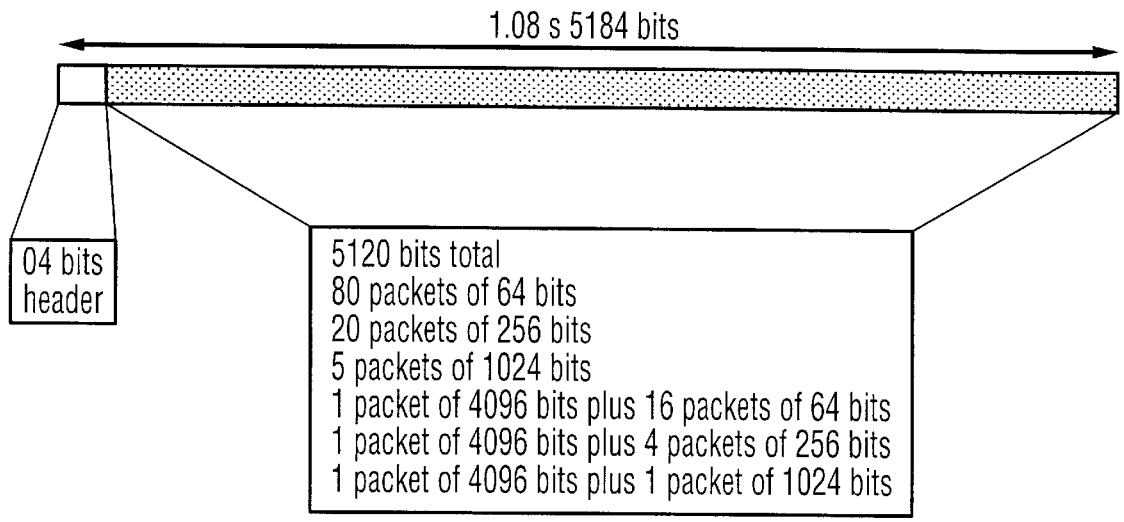
FIG. 4 illustrates a frame on the forward link.

FIG. 4 shows a typical 4.8 Kbps frame. This has a duration of 1.08 seconds and contains 5,184 bits including a 64-bit header. The remaining 5120 bits can be sent as 80 packets of 64, bits 20 packets of 256 bits, 5 packets of 1024 bits, one packet of 4096 bits plus 16 packets of 64 bits, one packet of 4096 bits plus four packets of 256 bits, or one packet of 4096 bits plus one packet of 1024 bits.

Each frame may contain several carriers. The forward link channel characteristics might typically be as follows:

| Information Rate bps | FEC rate | Channel Rate | Modulation | Bandwidth | $C/N_0$ |
|---|---|---|---|---|---|
| 600 | ½ | 1,200 | BPSK | 2,400 | 32.3 |
| 4800 | ¾ | 6,400 | QPSK | 6,400 | 42.3 |
| 19,200 | ¾ | 25,600 | 8PSK | 17,100 | 51 |

Examples of forward link channel mixes are as follows:

| TOTAL CAPACITY | NUMBER OF 600 BPS CHANNELS | NUMBER OF 4800 BPS CHANNELS | NUMBER OF 19200 BPS CHANNELS | TOTAL BANDWIDTH |
|---|---|---|---|---|
| 5.4 kbps | 9+(1) | 0 | 0 | 50 kHz |
| 38.4 kbps | (1) | 0 | 2 | 37 kHz |
| 48 kbps | (1) | 2 | 2 | 50 kHz |
| 19.2 kbs | (1) | 4 | 0 | 25 kHz |

For example, if packet data is arriving for a particular terminal at an average rate of 5.4 kbps per second, this data can be sent to the destination terminal by distributing it over 9 simultaneous 600 bps carriers. The rate is an average rate because the incoming data is buffered to even out bursts. Data can be sent at the rate of 38.4 kbs by sending it simultaneously on two 19.2 kbs carriers. 19.2 kbs can also be achieved by sending the data simultaneously on four 4.8 kbs carriers. This allows considerable flexibility depending on the data rate requirements and the availability of channels.

Each frame after passing through the digital-to-analog converter 22 is an analog baseband waveform containing all the carriers.

Figure 5:
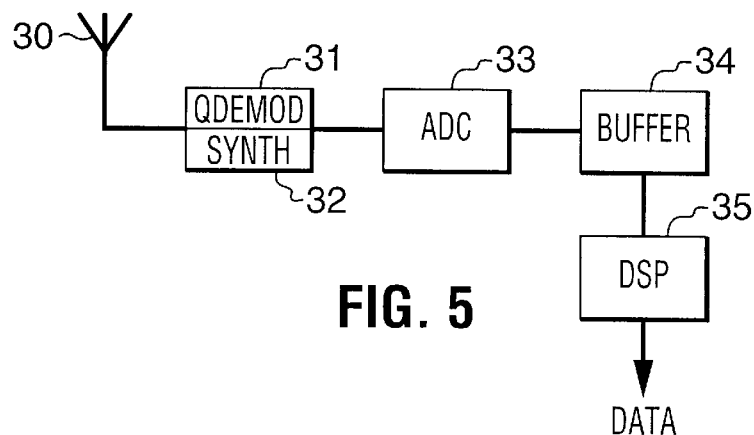
FIG. 5 is a block diagram of a remote terminal.

FIG. 5 is a block diagram of a remote terminal. In FIG. 5, the r.f. signal on the satellite downlink is picket up by antenna 30 and passed to Q demodulator 31 associated with frequency synthesizer 32. The demodulated baseband signal is passed to analog-to-digital converter 33, where it is quantized and stored in buffer 34 one frame at a time. The buffer 34 always stores the current frame regardless of whether that frame contains data for the associated terminal.

The central portion of the frame in the frequency domain contains the control signal, which DSP 35 recognizes and continually extracts. DSP 35 can be a type TMS320C60 or other advanced high speed digital signal processor.

The DSP continually extracts from the control signal, which represents a very small part of the frame, timing information, group configuration (number of carriers, bit rates, additional channel assignments), assignments (packet type, id, channel, time slot, packet length), acknowledgement packets (ACKs—packet type, id).

The control channel can also be use as a bulletin board to notify the terminals of beam frequency, back-up frequency, date, time, beam data, access control, return channels, configuration. By notifying the mobile terminals of the times of access, they can be put into a sleep mode between access times, thereby conserving battery power.

The control channel represents such as small part of the buffered frame that the extraction of the control information only uses minimal processor resources. Unless the control channel indicates that there is data present for a particular terminal, the DSP 35 in the terminal takes no further action. If the control channel indicates that data is present, the DSP 35 looks at the appropriate carrier frequencies to extract the digital data destined for the terminal. This means that a terminal can be advised of the presence of data intended for it simultaneously with the transmission of data because the frame carrying the raw data is already present in the terminal's buffer when the information from the control channel is extracted.

The DSP 35 carries out the following signal processing steps:

1. The control channel located in the center of the received band is first decimated and then demodulated.
2. If the control channel indicates an assignment for the terminal in question, the DSP extracts the necessary channel information, such as modulation, bit rate, coding, frequency offset, location in time, and message length.
3. The message is extracted from the stored pre-decimated data.
4. Finally the DSP 35 outputs the message to the destination.

Figure 6:
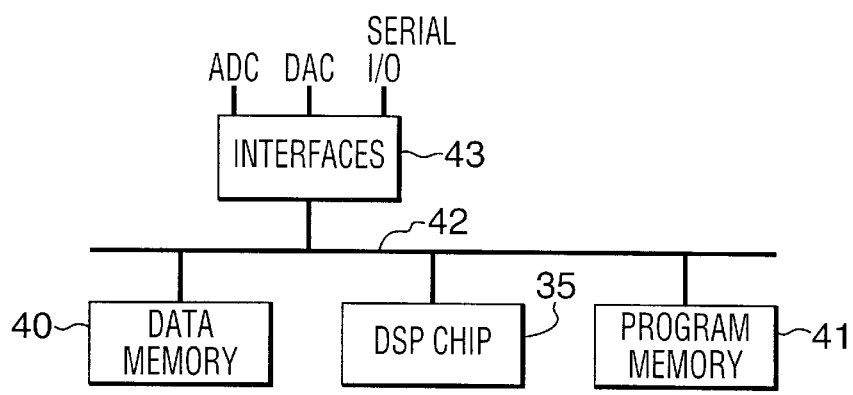
FIG. 6 is a more detailed diagram of a remote terminal.

FIG. 6 is a block diagram of an implementation of a mobile terminal on a circuit card. DSP 35 is connected to bus 42 along with program memory 41, which stores the instructions for controlling the DSP 35, and data memory 40, which stores the received baseband signal.

Access to the card is through interface unit 43, which provides connections to the analog-to-digital and digital-to-analog converters, and to a serial I/O port, which allows the DSP to be programmed, for example, with the aid of a personal computer.

Figure 7A:
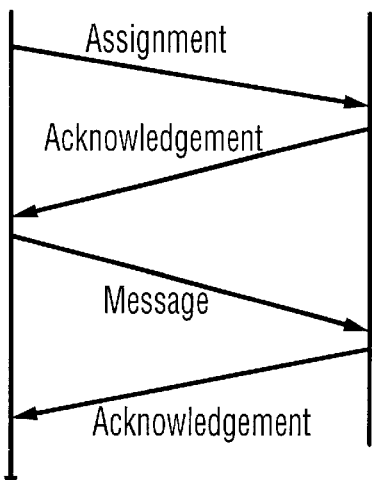
FIGS. 7a shows a prior art protocol and FIG. 7b shows a protocol with simultaneous transmission of data.

Latency is minimized because unlike the prior art there is no need for the control information to be sent before the data. FIG. 7a shows a prior art protocol. The control station must first transmit a channel assignment on a control channel, which tells a terminal to listen to a particular carrier for a message. Only when this control message has been acknowledged does the control station subsequently transmit a data message on the assigned channel, which is also acknowledged by the receiving terminal.

Figure 7B:
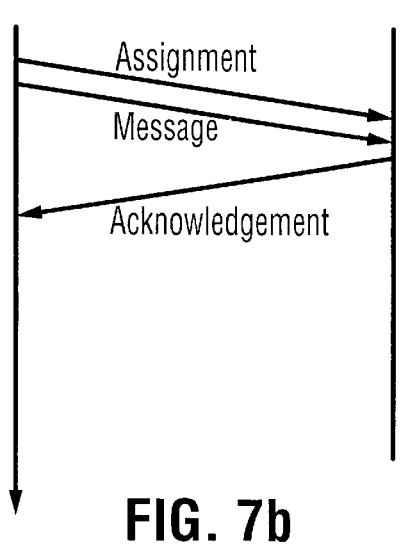

In a protocol in accordance with the principles of the invention, as shown in FIG. 7b, the control information and message are transmitted simultaneously and only the data message is subsequently acknowledged. This is possible because the terminal stores the raw digitized frame in its buffer 34.

The population of terminals can be arranged in groups so that different groups listen to different groups of carriers. For example, a first group of terminals can listen to a first group of carriers, spanning, for example, 50 KHz, a second group can listen to an adjacent group of carriers, and so on. In order to contact a particular terminal, the control station must choose a channel(s) in the group assigned to that terminal.

So far the discussion has only considered the forward link from the ground station to the terminals. A return link, which has a similar structure to the forward link, is provided to permit the terminals to communicate with the ground station.

Figure 8:
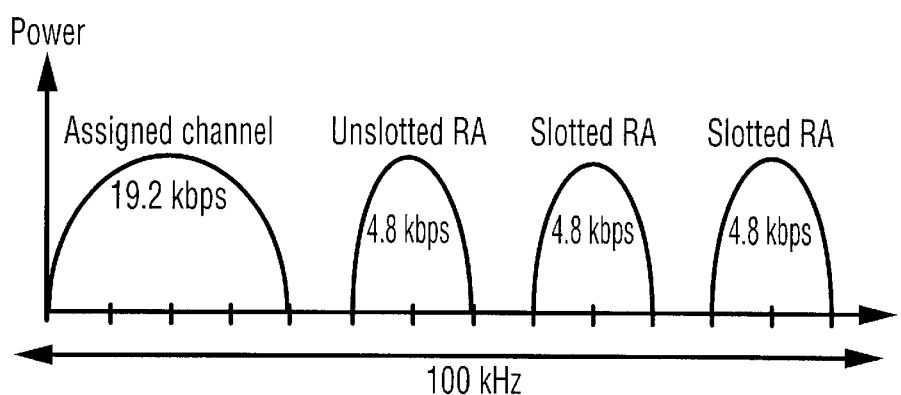
FIG. 8 shows the spectral distribution of the return link.

The structure of the return link is shown in FIG. 8. It consists of a 19.2 kbps permanently assigned channel (DA), a 4.8 kbps unslotted RA (random access) channel, and two 4.8 kbps slotted RA channels. The return link has a multiple SCPC architecture, variable bit rate transmission, and robust fade margin. Demodulation of the carriers occurs at the ground station within the sampling bandwidth.

The return link includes the following features: unslotted random access, 64 bit packets, 600, 4800 bit rates, 10% throughput.

The table below gives an example of the return link channel mix.

| Throughput (kbps) | 600 pbs | | | 4800 pbs | | | 19200 pbs | | | Bandwidth (kHz) |
|---|---|---|---|---|---|---|---|---|---|---|
| | RA | SA | DA | RA | SA | DA | RA | SA | DA | |
| 6 | | | | | | | | | | 30 |
| 24.9 | | | | | | | 1 | 1 | 1 | 60 |
| 31.5 | 1 | | 1 | 1 | 1 | 1 | 1 | 1 | 1 | 100 |
| 5.64 | 6 | 6 | 8 | | | | | | | 100 |

The described system provides a flexible satellite packet data system. It offers multiple simultaneous carriers enabled by per frame adaptive processing and high speed DSPs having different bit rates and power levels. A low bit rate control channel provides frequency, timing and frame content information.

The return channels use simultaneous multiple return access methods (slotted and unslotted ALOHA, assigned channel).

A bulletin board notifies terminals of beam frequencies, back-up frequencies, date, time, beam data, access control and return channel configurations.

Generally, the throughput of a transmission link is dependent upon a number of factors, including errors encountered by the transmission path. Techniques, such as Forward Error Correction (FEC) can be used to correct some of the errors on the transmission link. Different algorithms can be employed to match the error level that is tolerable by the application, for example a transition from ¾ to ½ scheme will increase the overhead of the FEC coding, and reduce the number of errors on the link after FEC coding while at the same time reducing the effective throughput (bps) for a given amount of space segment spectrum. Thus, it is advantageous to tolerate as many errors as can be tolerated by the upper layer protocols, applications and eventually the users of the service.

The applications that use the TCP transport layer have their throughput further affected by the TCP handling of errors. A TCP session treats an error as a congestion event in the network and hence reduces the congestion window to slow down the amount of data that can be transferred by the applications. Thus the throughput rate of TCP decreases as the number of errors increase on the link. Therefore for maximum throughput of application data it is imperative to reduce the number of errors on the transmission link.

Since the application data rate is affected by two contradictory factors, there is a need to conserve system resources, such as FEC coding overhead on one side and the TCP throughput constraint due to errors on the other. The stronger FEC produces fewer errors at a cost of higher coding overhead which, in turn, reduces the effective data rate on the channel. Errors on a transmission link cause TCP to loose segments, which are interpreted as congestion in the network which is corrected by reducing the amount of offered traffic to the network. Thus, a small number of errors can substantially reduce the effective throughput by reducing the size of congestion window. In a scenario where, the error rate is varied from a very low rate with techniques, such as a high FEC coding overhead, to a gradually increasing error rate achieved by the corresponding decrease in the FEC overhead, the effective throughput of the system increases until the TCP retransmission and congestion window become the dominant factor for limiting the effective data throughput at which point the throughput to the applications starts to decrease. Therefore, by monitoring various system variables, such as the FEC coding overhead, the TCP retransmission rate and an effective throughput of data to an application, it is possible to optimized data throughput to an optimum value where the system inputs, such as FEC overhead balances out the TCP congestion restriction.

Figure 9:
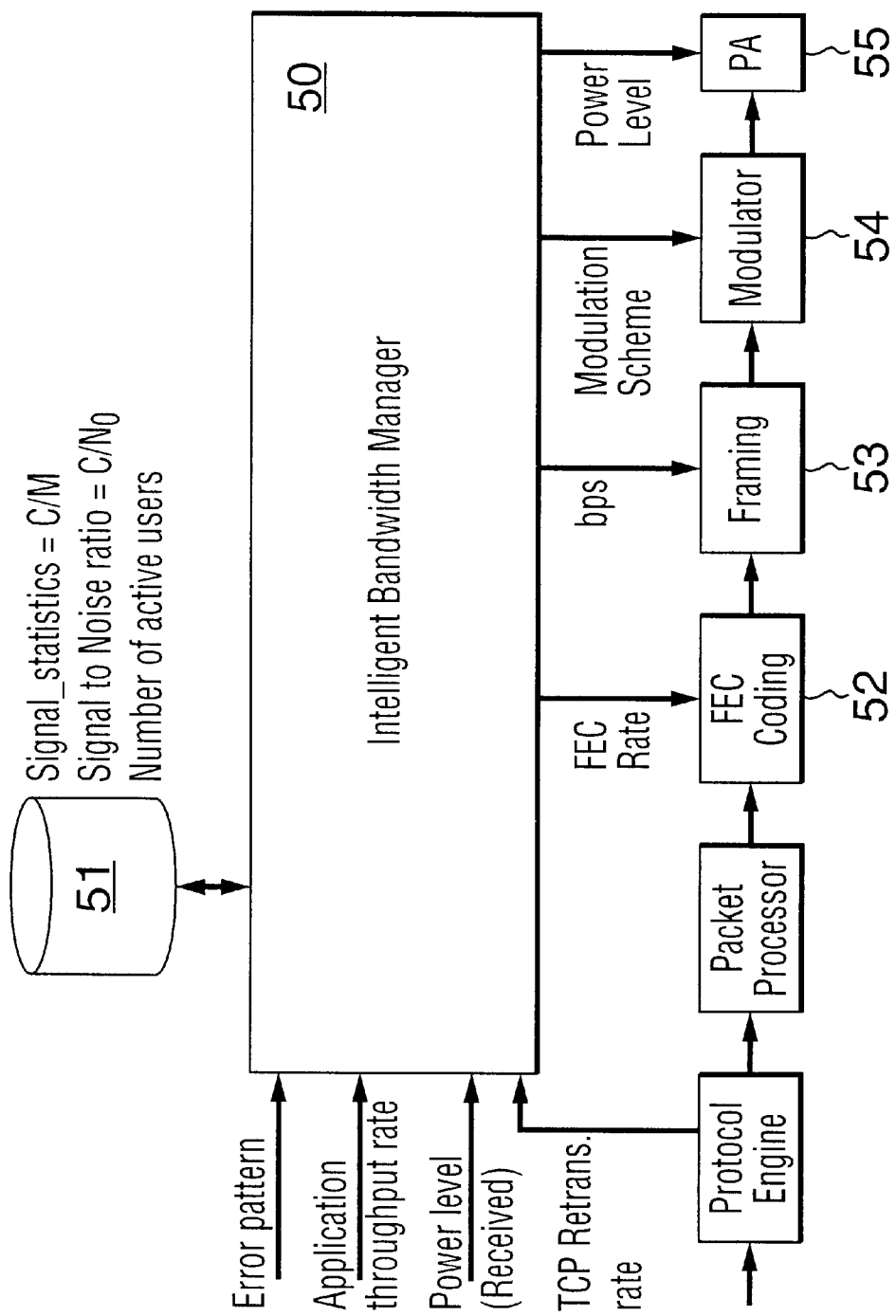
FIG. 9 is a block diagram of a bandwidth manager.

The optimization of data throughput for the Packet Data System according to one aspect of the present invention as illustrated in FIG. 9 employs an Intelligent Bandwidth Manager (IBM) 50. The initial function of IBM 50 is to allocate the spectral bandwidth to each user by some operator defined criteria. This could be as simple as the allocation of equal spectrum to each user, to a provisionable database based on user defined requirements. The IBM resides in the Earth Station Hub 10 (FIG. 1) and a simplified version resides in each terminal 11. The Hub IBM utilizes several inputs as shown in FIG. 9, to determine the course of action at any specific sampling interval.

The Hub has a database 51 which stores the pertinent information about the total system and each terminal. This includes, but is not limited to, the signal statistics and the Signal to Noise ratio ($C/N_0$). The signal statistic C/M represent the shape of signal strength against frequency which is useful in determining the information rate for a specific terminal. This measurement is stored for both the forward and the reverse direction. However, if one or these measurements is not available then the other can be used in its place until it is available. The noise level, ($C/N_0$), represent the ambient noise of the system.

The Hub data base 51 also stores system wide measurements, such as the number of active users at any one time. This information is available to the Hub IBM 50.

The function of Hub IBM is to monitor the effective bandwidth of the system and make changes to input settings in order to maintain an optimum effective bandwidth. The Hub IBM 50 utilizes the aforementioned information available from the data base 51 and the inputs to the IBM 50 as shown in FIG. 9 to optimize the service to a user. The input variables for the IBM 50 are the TCP retransmission rate; the input from the database (described earlier); application throughput data rate; the received power level and the recent error pattern. The TCP retransmission rate provides information about the number of retransmissions that were requested within a given sampling interval, the input from the database include measurements and configuration data identified earlier, recent error pattern are used by the IBM to predict the errors and hence take a corrective action to the errors which are likely to occur and application throughput data rate is the key parameter used to determine if the system is running optimally.

Based on these inputs and the aforementioned objective of optimizing data throughput rate, the IBM 50 makes a decisions for the FEC coding scheme and provides an input to FEC coding function 52. The IBM also decides on the optimum number of bits per frame (or transmission data rate) and provides this information to the framing function 53. Similarly, the IBM provides information respecting the Modulating scheme and the Transmit Power level to the appropriate functional blocks 54, 55, respectively, in the system as shown in FIG. 9. The decision, in IBM, is made by an expert system using heuristic rules to alter the above parameters for the purpose of optimizing the bandwidth to the application. The heuristic rules are defined by an 'expert' with the intuitive knowledge of the operation of the system.

A Terminal IBM (not shown), controls a single terminal, and is similar to the Hub IBM of FIG. 9 except that the EIRP (effective isotropic radiation power) output to the Power Amplifier is not required as the terminal always works on the maximum power. In addition, it does not need a database as the measurements pertain to one terminal and the measurements can be stored locally.

The 'expert' rules are composed using natural language to define the relationship between various input variables and the effective output data rate. These rules are then translated into equivalent representations using fuzzy logic for use by the decision engine that runs on the rules to mimic human decision making. The input measurements are translated into a unique set of conditions that drive the decision engine using the rules defined by 'experts' to make a decision which mimics a decision that a human being would have made in similar situations.

Although the system has been described as implemented with a DSP, it will be understood by one skilled in the art that it is also possible to implement it in a general purpose microprocessor, such as a Pentium II, for example.

The system has a novel packet structure and low latency due to an improved protocol requiring fewer acknowledgements.

What is claimed is:

1. A packet data communication system having a control station and a plurality of remote terminals that communicate on demand with said control station over a wireless link,
said control station comprising:
 a data port for receiving data packets destined for said terminals;
 means for generating a plurality of data channels for carrying said data packets;
 means for assigning said data packets destined for a particular terminal to one or more of said data channels;
 means for generating a control channel carrying control information required to permit data to be extracted from said data channels; and
 means for transmitting said data channels and said control channel simultaneously to said remote terminals as an aggregate signal; and
each of said terminals comprising
 a receiver for receiving said aggregate signal;
 an analog-to-digital converter for digitizing said aggregate signal;
 a buffer for storing said aggregate signal containing said data channels and said control channel;
 a processor for continually processing said stored aggregate signal to read said control channel stored in said buffer and extract said control information therefrom without reading said one or more data channels; and
 said processor further processing said stored aggregate signal to extract said packet data destined for said terminal from one or more of said data channels in response to control information received on said control channel identifying said terminal as a destination for said packet data.

2. A packet data communication system as claimed in claim 1, wherein said transmitting means transmits said channels as a framed baseband signal, each frame containing one or more data channels and the control channel.

3. A packet data communication system as claimed in claim 2, wherein said buffer stores a frame of raw baseband data.

4. A packet data communication system as claimed in claim 3, wherein said processor comprises a digital signal processor for extracting said control information from said stored frame of raw baseband data.

5. A packet data communication system as claimed in claim 1, wherein each said terminal further comprises a demodulator for demodulating said received signal prior to analog-to-digital conversion.

6. A packet data communication system as claimed in claim 5, wherein said demodulator is a quadrature demodulator.

7. A packet data communications system as claimed in claim 4, wherein said digital signal processor further extracts said packet data from said data channels in response to said control information received on said control channel.

8. A packet data communication system as defined in claim 1, where said means for assigning data packets includes means to dynamically assign said data packets to one or more channel types.

9. A packet data communication system as defined in claim 8 wherein said channel types include: random access channels; assigned TDM channels; assigned TDMA channels; and dedicated channels.

10. A method of establishing communication between a control station and one or more of a plurality of mobile terminals over a wireless link, comprising the steps of:

generating a plurality of data channels and a control channel;

dynamically assigning one or more data channels to a destination terminal;

modulating said one or snore data channels with packet data;

modulating said control channel with information pertaining to said data channels and required to extract said packet data therefrom;

transmitting said data channels and said control channel simultaneously as an aggregate signal to said mobile terminals;

buffering said aggregate signal in digitized form at said destination terminal;

continually processing said aggregate signal stored in said buffer to extract said control information therefrom without reading one or more said data channels; and in response to control information received on said control channel and stored in said buffer as part of said aggregate signal, extracting said packet data from said aggregate signal stored in said buffer when said control information determines that said packet data is destined for said destination terminal.

11. A method as claimed in claim 10, wherein said aggregate signal is transmitted as a famed signal, each frame containing one or more of said data channels and said control channel.

12. A method as claimed in claim 11, wherein said aggregate signal is stored in said buffer one frame at a time, and said control information is extracted from said stored frame to determine whether said stored frame contains data for the destination terminal.

13. A method as claimed in claim 10 wherein said aggregate signal comprises a baseband signal that is modulated onto an r.f. carrier.

14. A method as claimed in claim 13, wherein said r.f. carrier is first demodulated at said terminals to extract said baseband signal, and said baseband signal is then passed through an analog-to-digital converter prior to being stored in said buffer.

15. A packet data communication system as claimed in claim 7, wherein said digital signal processor extracts channel information from said control channel, said channel information being selected from the group consisting of: modulation, bit rate, coding, frequency offset, location in time, and message length.

16. A method as claimed in claim 10, wherein said control information includes information selected from the group consisting of: modulation, bit rate, coding, frequency offset, location in time, and message length.

* * * * *